July 15, 1969     H. ZIMMET     3,455,224

FILM TRANSPORTING MECHANISM FOR PHOTOGRAPHIC CAMERAS

Filed April 15, 1966     2 Sheets-Sheet 1

INVENTOR
HANS ZIMMET
By Young & Thompson
ATTYS.

United States Patent Office 3,455,224
Patented July 15, 1969

3,455,224
FILM TRANSPORTING MECHANISM FOR
PHOTOGRAPHIC CAMERAS
Hans Zimmet, Radebeul, Germany, assignor to Veb
Pentacon Dresden Kamera- und Kinowerke,
Dresden, Germany
Filed Apr. 15, 1966, Ser. No. 542,853
Int. Cl. G03b *19/04*
U.S. Cl. 95—31                                  8 Claims

ABSTRACT OF THE DISCLOSURE

A photographic camera which includes a film transport device providing a constant length of film travel at each exposure transport stage. An entrainment disc capable of driving the take-up spool key is carried by the locking handle shaft. A driving wheel between the entrainment disc and the film key is movable by a spring force after each exposure transport stage into an initial position. A stop disc is rotatable about said shaft for determining said initial position, said stop disc engaging with the rotating entrainment disc during the last part of the travel of the handle so as to alter the initial position of the driving wheel in accordance with the increasing roll of film. The entrainment disc is provided with a toothed segment and the stop disc is provided with a system of teeth. A bifurcated lever is pivotally mounted on a fixed part of the device with a pinion mounted on one arm of said lever which can be caused to engage simultaneously with the toothed segment and with the system of teeth for effecting the engagement between the stop disc and the entrainment disc. A trip contact disc is provided which has a notch which interacts with the other arm of the lever.

---

The present invention relates to a photographic camera having a film transport device providing a constant length of film travel, by means of a handle which at the same time cocks the shutter.

In cameras having film transport devices of this kind steps must be taken to ensure that the angle of rotation of a film key driving the film take-up spool is reduced in accordance with the increasing diameter of the roll of film. Systems are known in which this is achieved by means of a "travelling stop" by which, with the aid of a control cam, the length of travel of the film key or of a gearing element coupled to it is shortened each time the handle is operated.

This principle, however, is only applicable when the films used in the camera in question are always of the same thickness. Recently, however, roll films have been manufactured by a new method, enabling 24 exposures to be obtained in place of the hitherto customary 12, by omitting the strip of protective paper. When a cam controlled travelling stop is employed it is not possible for the old or the new type of film to be used as desired, as the pitch of the cam can only be designed for one of them.

Film transport devices are also known in which the thickness of the film can be disregarded, because the length of travel is limited by a measuring roller, moved by the transported film, in conjunction with a locking device. These devices, however, usually suffer from the drawback that the travel of the handle is shortened as the diameter of the take-up roll of film increases.

Attempts have been made to eliminate this disadvantage by causing the measuring roller to release a coupling situated between the winding shaft and the film spool instead of acting on the locking device. Since the uncoupling operation involved is subjected to the full torque required for the film transport operation, this system necessarily entails a considerable amount of wear in the coupling parts.

The purpose of the present invention is to provide a film transport device for photographic cameras, providing a constant length of film travel, by means of a handle in which the principle of the travelling stop is utilized and which is nevertheless independent of the thickness of the film employed.

According to the invention we provide a photographic camera having a film transport device for feeding constant lengths of film by means of a constant stroke of a handle rotatable on a shaft, which shaft at the same time cocks the camera shutter, a film take-up driving key, an entrainment disc carried by the shaft which disc is capable of driving said film key, a driving wheel between said entrainment disc and film key being movable by a spring force after each exposure transport stage into an initial position, a stop disc rotatable about said shaft for determining said initial position, said stop disc engaging with the rotating entrainment disc during the last part of the travel of the handle so as to alter the initial position of the driving wheel in accordance with the increasing roll of film, a toothed segment carried by the entrainment disc, a system of teeth provided on the stop disc, a bifurcated lever pivotally mounted on a fixed part of the device, a pinion mounted on one arm of said lever and which can be caused to engage simultaneously with the toothed segment and with the system of teeth for effecting the engagement between the stop disc and the entrainment disc, and a trip contact disc having a notch which interacts with the other arm of the lever.

In a particularly advantageous application of the principle of the invention the relevant coupling devices consist of a toothed segment borne by the entrainment disc and of a pinion which can be caused to engage with the toothed segment and with the system of teeth and which is supported on a lever arm of a preferably bifurcated lever of which the other arm interacts with a notch of the trip contact disc.

According to a further characteristic of the invention, the driving element of the film key consists of a lug which extends into a segmental recess provided on the stop disc and which is borne by a cogwheel supported on the winding shaft and connected with the film key via an intermediate gearing and the locking roller.

To enable the entrainment disc and thus the handle to be returned to the initial position, despite the coupled pinion, the invention provides that the toothed segment borne by the entrainment disc is to be pivotably mounted on the latter and pulled by a spring towards a stop affixed to the said entrainment disc.

According to a further characteristic of the invention, the stop disc influenced by a restoring spring is prevented by a locking lever, which engages its teeth, from returning to the initial position, this locking action being nullified by control devices connected with the rear wall of the camera, so that when the latter is opened the stop disc is automatically returned to its initial position. In this system a toggle lever bearing the locking lever is preferably mounted coaxially with the lever bearing the pinion.

To release the coupling between the stop disc and the entrainment disc, the invention also provides that the lever bearing the pinion is to be preferably coupled, via a pin and slot connection, with a lever influenced by the release of the camera.

Finally, the invention provides that the trip contact disc is to be fitted with a locking spring of which the free end moves into position in front of the notch of the trip contact disc when the lever arm interacting with the latter leaves the slot, the locking action of the said spring being nullified, after one revolution of the trip contact disc, by the lever arm moving up onto the free end of the spring.

Since, before the first movement of the film is brought about, the notch of the trip contact disc assumes no defined position in respect of the lever arm interacting with it, so that the moment at which the coupling between the stop disc and the entrainment disc is undefined, the invention further provides for a system enabling the travelling stop to be adjusted independently of the coupling operation between the stop disc and the entrainment disc.

This additional problem is preferably solved by a system in which that end of the segmental recess of the stop disc which forms the stop for the lug is situated at a certain angle $\alpha$ in front of the said lug. On the first movement the stop disc is pivoted, by a corresponding length of the lug and of the segmental recess, through the said angle $\alpha$, and the angle $\alpha$ is equal to or greater than the maximum pivoting angle obtainable by one action of the coupling which takes place between the stop disc and the entrainment disc and which is controlled by the trip contact disc.

The invention will be described below in greater detail, in conjunction with a certain embodiment thereof.

Figure 1:
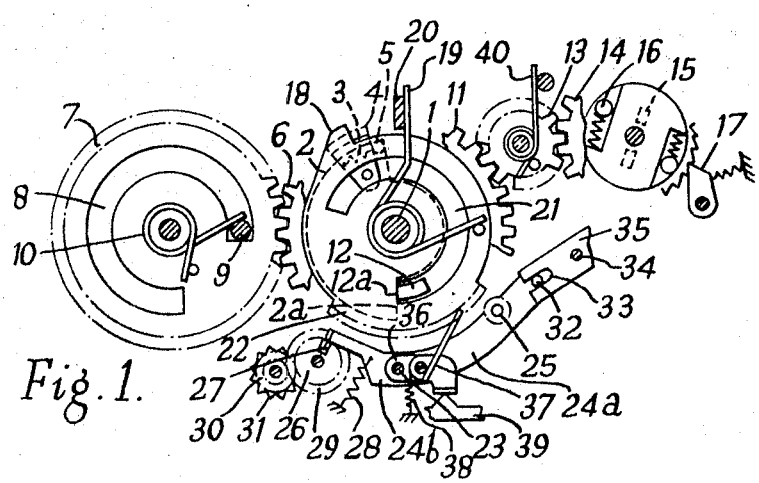
FIGURE 1 shows the film transport mechanism in a position which it occupies before the second movement of the film.

The handle, not shown in the drawing, is situated on a winding shaft 1. An entrainment disc 2 is rigidly connected with the latter and bears a toothed segment 4 which is pivotably mounted on it and is drawn by a spring 3 towards a stop 5 affixed to the entrainment disc 2. A cogwheel 6 is likewise rigidly connected with the winding shaft 1 and engages with a cogwheel 7 which cocks the shutter in a manner already known in itself and not shown in the drawing. The cogwheel 7 has a segment recess 8 which, in conjunction with a stop bolt 9, rigidly affixed to the housing, limits the travel of the handle in both directions. A restoring spring 10 acts on the train of wheels consisting of the cogwheel 6 and 7 and also the entrainment disc 2 and the handle.

A cogwheel 11, which bears an engaging lug 12, is mounted on the winding shaft 1, so that it is freely rotatable. The cogwheel 11 is connected with the film key 15 but via intermediate wheels 13 and 14. In this system the film key is caused to participate in the movement by means of roller clutch 16, while the return movement of the film key is prevented by a ratchet 17.

A stop 18 likewise is mounted on the winding shaft 1 so as to be freely rotatable. This stop disc is influenced by a restoring spring 19 which tends to pull it towards a stop 20 rigidly connected with the housing. The engaging lug 12 provided on the cogwheel 11 extends into a segment recess 21 provided on the stop disc 18. Part of the periphery of the stop disc 18 is provided with a system of teeth 22.

A pinion 25 is provided on one arm 24a of a bifurcated lever 24 pivotably mounted at 23 and can be caused to engage with the toothed segment 4 and the system of teeth 22. The off-set arm 24b of the lever 24 is situated within the zone of action of the trip contact disc 26. The trip contact disc 26 is provided with a notch 27 into which the lever arm 24b can drop, a spring 28 acting on the said arm. The trip contact disc 26 is connected, via a friction clutch of a kind known in itself and not shown in the drawing, with a cogwheel 29 which engages with a cogwheel 30, the latter being coupled with a measuring roller 31 driven by the film. A pin 32 affixed to the lever arm 24a engages a slot 33 of a lever 35 pivotably mounted at 34 and connected with the camera release.

A toggle lever 36, pivotable about the bearing point 23, is provided with a locking lever 37 which can be caused to engage with the teeth 22 of the stop disc 18 and prevents the return of the said spring-loaded stop disc 18. The toggle lever 36, which is subjected to the action of a drawstring 38, is influenced by a cam 39 provided on the rear wall of the camera.

Figure 2:
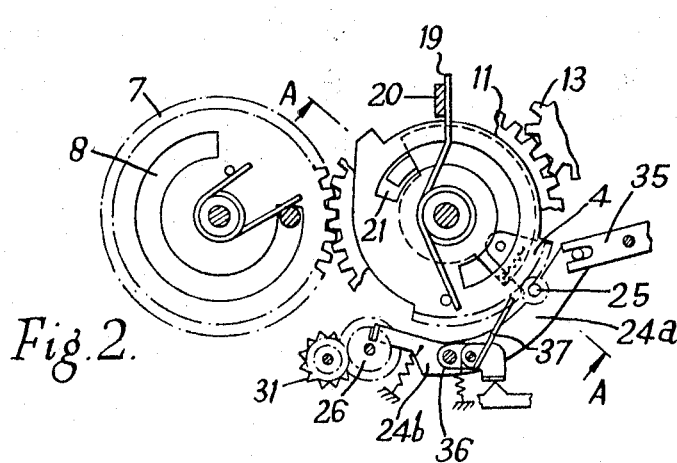
FIGURE 2 shows the film transport mechanism in a position which it occupies at the end of the second movement of the film.
Figure 3:
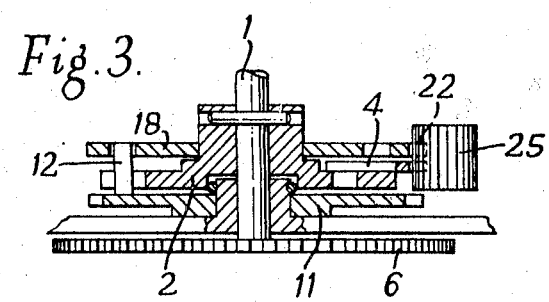
FIGURE 3 shows a section along the line A—A of FIGURE 2, on a larger scale.

The device to which the invention relates operates as follows:

In order to render it more comprehensible, a description will first be given of the winding operation for the second movement of the film (FIGURES 1 and 2).

When the winding handle is operated anti-clockwise the edge 2a of the entrainment disc 2 moves the engaging lug 12 via its edge 12a, resulting in a rotation of the cogwheel 11, this rotation being transmitted via the intermediate wheels 13 and 14 and the roller coupling 16 to the film key 15 and thus to the film spool. At the same time, the film transport operation thus commencing causes the measuring roller 31 to participate in the movement of the film and results in a clockwise rotation of the trip contact disc 26 coupled to it. In this system one rotation of the trip contact disc 26 corresponds to the length of one piece of film transported, this length being less than the frame gauge. After one revolution has been performed the off-set lever arm 24b can drop into the notch 27, the pinion 25 thus being caused to assume a position in which its system of teeth can result in a coupling between the toothed segment 4 and the teeth 22. This coupling action, occurring during the last part of the movement, results in an anti-clockwise displacement of the stop disc 18 until the end of the movement. This means that for the next frame gauge movement the possible travel of the engaging lug 12 has been shortened. The stop disc 18 is increasingly displaced with the increase in the spool diameter, so that the return movement of the lug 12 becomes continually shorter, causing the lengths of film transported to remain constant. The friction coupling provided between the cogwheel 29 and the trip contact disc 26 makes it possible for the film transport operation to be continued until the termination of the frame gauge movement, despite the fact that the trip contact disc 26 is blocked by the lever arm 24b.

After the completion of the movement the entrainment disc 2, with the cogwheels 6 and 7, are moved back by the restoring spring 10, and the cogwheel 11, with its engaging lug 12, is moved back by the restoring spring 40, which acts on the intermediate wheel 13, while the return movement of the stop disc 18 is prevented by the locking lever 27. The return of the entrainment disc to its initial position is rendered possible by the fact that the toothed segment 4 is pivotably mounted on it and, in the return movement, detaches itself from the stop 5, is pivoted anti-clockwise and is thus able to move past the teeth of pinion 25.

Figure 4:
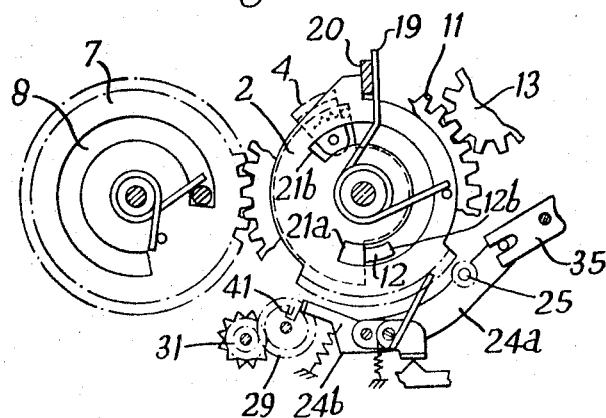
FIGURE 4 shows the film transport mechanism in a position which it occupies before the first movement of the film is carried out.

When the camera is operated the pivoting of the lever 35 causes the lever arm 24b to be lifted out of the notch 27, the pinion 25 thus being removed from the range of action of the toothed segment 4 and of the system of teeth 22. They are prevented from immediately dropping back by a spring 41 (see FIGURE 4) which acts as a locking device and of which the free end moves into position in front of the notch. The lever arm 24b is enabled to fall back into the notch 27, after the trip contact disc 26 has performed one revolution, by the fact that the lever arm 24b moves against the spring 41 and presses it out of the way.

When the entire film has been exposed the cam 39 releases the toggle lever 36 when the rear wall of the camera is open. The said toggle lever is pivoted clockwise, so that the locking lever 37 emerges from the teeth 22 as a result of which the stop disc 18 is enabled by its restoring spring 19 to return to its initial position, governed by the stop 20.

Figure 5:
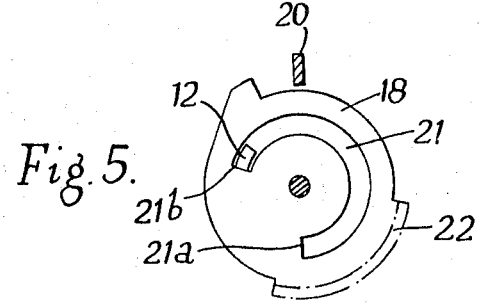
FIGURE 5 shows the position occupied by the stop disc after the first movement of the film has been carried out.

Now that the transport process from the second movement onwards has been described, the transport process of the first movement will be explained below:

After the film has been inserted and an index provided on the paper leader has been adjusted to a starting mark shown on the camera housing, the rear wall of the housing is closed. In this process the position of the trip contact disc 26 is not defined. It may, for example, assume the position shown in FIGURE 4. In order to avoid the necessity of using a special device for defining the position of the trip contact disc 26 a device has been provided which makes it unnecessary for the first transport movement to be controlled by the measuring roller 31 or the trip contact disc 26 as a major governing magnitude. For this purpose, the initial position of the limiting edge 21a of the segment recess 21 of the stop disc 18 is at an angle $\alpha$ in respect of the initial position of the engaging lug 12. This angle $\alpha$ corresponds to a displacement of the stop disc 18 which is equal to or somewhat greater than the maximum possible single displacement of the stop disc 18 by the coupling of the toothed segment 4 and of the system of teeth 22 via the pinion 25. When the second movement is carried out the displacement of the stop disc 18 is now brought about by the fact that the edge 12b of the engaging lug 12 makes contact, at the end of the first movement, with the edge 21b of the segment recess 21 (FIGURE 5), the lengths of the engaging lug 12 and of the segment recess 21 being selected in such a way as to ensure the displacement of the stop disc 18 amounting to the angle $\alpha$.

The coupling effected between the entrainment disc 2 and the stop disc 18, as a result of the fact that the lever arm 24b drops into the notch 27 of the trip contact disc 26 at an undefined moment, thus does not determine the displacement distance for the stop disc 18 in the first movement, since the displacement caused by this coupling would be no greater than the displacement by the lug 12 amounting to the angle $\alpha$.

After the engaging lug 2 and thus the handle likewise have returned to their initial position, all the parts of the film transport device assume the position shown in FIGURE 1, with the sole difference that the pinion 25 is still in the coupling position.

The invention is by no means confined to the example shown in the drawing. It is possible, for example, for the coupling described between the stop disc 18 and the engaging lug 2 via the pinion 25 to be replaced by a coupling in the form of a friction clutch, by using a friction roller in place of the pinion 25, the said roller being caused to come to rest against the stop disc 18 and the entrainment disc 2.

I claim:

1. In a photographic camera having a film transport device for feeding constant lengths of film by means of a constant stroke of a handle rotatable on a shaft, which shaft at the same time cocks the camera shutter, and having a film take-up spool driving key, the provision of an entrainment disc carried by the shaft which disc is capable of driving said film key, a driving wheel between said entrainment disc and said film key being movable by a spring force after each exposure transport stage into an initial position, a stop disc rotatable about said shaft for determining said initial position, said stop disc engaging with the rotating entrainment disc during the last part of the travel of the handle so as to alter the initial position of the driving wheel in accordance with the increasing roll of film, a toothed segment carried by the entrainment disc, a system of teeth provided on the stop disc, a bifurcated lever pivotally mounted on a fixed part of the device, a pinion mounted on one arm of said lever and which can be caused to engage simultaneously with the toothed segment and with the system of teeth for effecting the engagement between the stop disc and the entrainment disc, and a trip contact disc having a notch which interacts with the other arm of the lever.

2. A camera according to claim 1 including a stop affixed to the entrainment disc, and wherein the toothed segment carried by the entrainment disc is pivotably mounted on the latter and is drawn by a spring towards a stop.

3. A camera according to claim 1 having a lever movable by the camera release and wherein a pin and slot connection is provided for coupling the bifurcated lever bearing the pinion with said lever movable by the camera release.

4. A camera according to claim 1, wherein a locking spring is provided on the trip contact disc and of which the free end moves into position in front of the notch of the trip contact disc when the lever arm interacting with the trip contact disc leaves the notch, its locking effect being nullified after one rotation of the trip contact disc, by the lever arm moving up onto its free end.

5. A camera according to claim 1, including a cogwheel rotatable with the cocking handle, an intermediate gearing and a locking roller connecting said cogwheel with said film key, wherein the driving element for the film key consists of a lug which extends into a segmental recess provided on the stop disc, the driving element being carried by said cogwheel with the film key.

6. A camera according to claim 5, wherein that edge of the segment recess of the stop disc which forms the stop for the lug is situated at a certain angle in advance of the said lug when in its initial position and that in the first movement the said edge is pivoted by a certain length of the lug and of the segmental recess through the said angle, which latter is equal to or greater than the maximum pivoting angle obtainable by the coupling produced by the trip contact disc between the stop disc and the entrainment disc.

7. A camera according to claim 1, including a restoring spring urging said stop disc to run back, a control device connected with a removable portion of the camera housing, and wherein a locking lever is provided, by which the stop disc is prevented from moving back, by the engagement of the lever in the system of teeth, the locking action being nullified by said control device when said portion of the camera housing is opened.

8. A camera as claimed in claim 7, wherein a toggle lever bearing the locking lever is mounted coaxially with the lever bearing the pinion.

References Cited

UNITED STATES PATENTS 2,148,636   2/1939   Muller et al. _____ 95—31

NORTON ANSHER, Primary Examiner

J. F. PETERS, Assistant Examiner